United States Patent [19]

Ritter et al.

[11] 4,420,903
[45] Dec. 20, 1983

[54] SHIPPING CONTAINER FOR LIVING BOTANICALS

[75] Inventors: Alexander S. Ritter, Coral Gables; James A. Lee, Miami, both of Fla.

[73] Assignee: Far West Botanicals, Inc., Miami, Fla.

[21] Appl. No.: 371,427

[22] Filed: Apr. 23, 1982

Related U.S. Application Data

[63] Continuation-in-part of Ser. No. 257,101, Apr. 24, 1981, abandoned.

[51] Int. Cl.³ .............................................. A01G 25/00
[52] U.S. Cl. ........................................... 47/81; 47/84; 206/423
[58] Field of Search .................... 47/41.12, 66, 73, 74, 47/79, 80, 81, 87, 84; 206/523, 423

[56] References Cited

U.S. PATENT DOCUMENTS

| | | | |
|---|---|---|---|
| 2,246,490 | 6/1941 | Flues | 47/81 |
| 3,154,884 | 11/1964 | Amar et al. | 47/1 |
| 3,181,693 | 5/1965 | Freistat | 206/523 |
| 3,273,284 | 9/1966 | Anagnostou | 47/74 |
| 3,314,194 | 4/1967 | Halleck | 47/84 X |
| 3,375,607 | 4/1968 | Melvold | 47/74 |
| 3,467,245 | 9/1969 | Kawawada | 206/523 |
| 3,467,609 | 9/1969 | Adams et al. | 47/66 |
| 3,576,088 | 4/1971 | Arca | 47/81 |
| 3,834,072 | 9/1974 | Rack | 47/74 |
| 3,866,352 | 2/1975 | Herveling et al. | 47/81 |
| 3,867,789 | 2/1975 | Jacobson | 47/41.12 |
| 3,899,850 | 8/1975 | Gluck et al. | 47/74 |
| 4,035,951 | 7/1977 | Dedolph | 47/66 |
| 4,071,043 | 1/1978 | Carlson | 206/223 X |
| 4,098,021 | 7/1978 | Gruber | 47/66 |
| 4,329,814 | 5/1982 | Blicha | 47/79 |

FOREIGN PATENT DOCUMENTS

| | | | |
|---|---|---|---|
| 1136150 | 9/1962 | Fed. Rep. of Germany | 47/80 |
| 1098155 | 1/1968 | United Kingdom | 47/81 |
| 1400450 | 7/1975 | United Kingdom | 47/81 |
| 1405125 | 9/1975 | United Kingdom | 47/87 |

*Primary Examiner*—James R. Feyrer
*Attorney, Agent, or Firm*—John Gibson Semmes

[57] ABSTRACT

A portable container for living botanicals such as rooting plants, bulbs or seedlings, composed in part of either inert and/or biodegradable fillers, characterized by securing the plant and its root structure against dislocation while insuring adequate access to water and/or nutrient vapors. Use is made of soilless growth media may be in a plant net container or a natural soil as the media, for initial plant growth and in a larger pot container for sustained plant growth. The larger soilless media portion is molded in two halves whereby the net rooting container may be compressibly secured in place by molded flaps. A given young plant may continue growing therein, suffering little or no shock in the shipping and transplanting process. Water and/or nutrient overfill is precluded by coactive relationship between an overfill tube and the larger soilless media portion.

4 Claims, 4 Drawing Figures

SHIPPING CONTAINER FOR LIVING BOTANICALS

CROSS-REFERENCES TO RELATED APPLICATIONS

This is a continuation-in-part of our co-pending patent application Ser. No. 257,101, filed on Apr. 24, 1981 of the same title, now abandoned.

BACKGROUND OF THE INVENTION

This invention relates to the growing of tuber-propagated and/or seedling plants in a composite container whereby the plants may be economically and safely shipped in a small net pot from a given nursery to a distribution outlet location, quickly and conveniently repotted and grown for an indefinite time, in new composite containers. The invention is directed to the processes of growing decorative plants which are usually propagated in beds, by hydroponics, or in flower pots as distinguished from vegetable crop plants. Plants so propagated may be transported for varying distances to wholesale or retail outlets where they would be repackaged into decorative containers containing a composite nutrient soil and then sold to the retail trade. In this instance the net pot containing the seedling is shipped independently of the soil block and associated container in which the net pot is deposited.

Botanical garden plants are initially grown from seed to seedling in a nutrient soil medium in a small pot, usually plastic or some other inexpensive material. Upon reaching threshold growth stage, the plant pots, containing the young plants and soil medium are shipped by air, rail or truck to wholesale or retail distributors. Alternatively, the small plants are repotted by the nursery into decorator pots and then forwarded to the wholesaler. The wholesaler distributes either the small pots or decorator pots to the retailer where they are displayed on shelves for purchase by the general public.

Usually plants offered at retail are not forwarded in decorator pots, the reason being that when shipped from a nursery they are apt to arrive dirty and in poor condition, requiring extensive cleaning, mending and replacement before the pot plant unit is ready for sale. The cost of otherwise shipping and protecting the decorator pot, filled with soil, will be significantly greater than shipping a small plant pot. Repotting, of course, creates shock to the young plant, often resulting in substantial plant loss and inconvenience. The wholesaler is thus reluctant to repot the plant because of the processing cost of removing and throwing out the original growth pot, the time consuming hand work, messiness of repotting the plant in soil and the cost of purchasing a decorator pot. By the same token, plant growth pots which are also found on retail shelves although functional, are unattractive to the ordinary purchaser. As a result of customary practices, the customer is forced to buy an additional decorator pot in which to hide the growth pot.

Inventors in the art have attempted to solve at least some of these problems. Nelson, U.S. Pat. No. 2,891,355 attempts to solve the mess and discoloration problem caused by the use of soil by substituting a synthetic material for the soil. Various distinct types of growth pots have been created as exemplified by the patents to Chadwick, U.S. Pat. No. 115,162; Adams et al., U.S. Pat. No. 3,467,609; Gruber, U.S. Pat. No. 4,098,021; Carlisle, U.S. Pat. No. 4,179,846; Southard, U.S. Pat. No. 1,200,396; and Kleb, U.S. Pat. No. 1,428,829. Known art also includes the following: Amar et al U.S. Pat. No. 3,154,884; Anagnostou U.S. Pat. No. 3,273,284; Melvoid U.S. Pat. No. 3,375,607; Arca U.S. Pat. No. 3,576,088; Jacobson U.S. Pat. No. 3,867,784, each distinguishable as will hereinafter appear.

In shipping growth pots from the nursery, the cost of shipping the growth pot is actually non-recoverable as the pot is usually later thrown out when the plant is repotted by the ultimate purchaser. The cost of shipping a decorator pot filled with nutrient soil could be saved if the pot and growing medium were supplied by the wholesaler. The present invention thus utilizes a light weight cone shaped net pot in which the young seedling is grown, transported and transplanted. The growth medium in the net pot may contain soil or a soilless medium, adapted to provide all the nutrients necessary for a young growing plant.

The soil substitute consists of a synthetic material containing such nutrient as may be necessary to sustain plant life for a period of up to twelve months. The use of synthetic material forming a substratum, hereinafter defined, is indispensable. Thus the more complex preparatory steps of the art are eliminated herein, whereby only the simplest maintenance, such as the addition of water is required to sustain effective growth of the botanicals.

It is an object of the present invention to provide a growth container which may be easily utilized by a wholesaler distributor in a botanical replanting process.

It is a further object of this invention to provide an economical shipping container for young botanical plants.

It is another object of this invention to provide a simple potting system whereby the botanical growth pot may be most efficiently and economically repotted into a decorator pot.

It is another object of the present invention to provide a simple potting system such that plant watering will be necessary at intervals of 30 days only.

DESCRIPTION OF PREFERRED EMBODIMENTS

These and other objects of the invention will become apparant by reference to the description and drawings in which.

Figure 1:
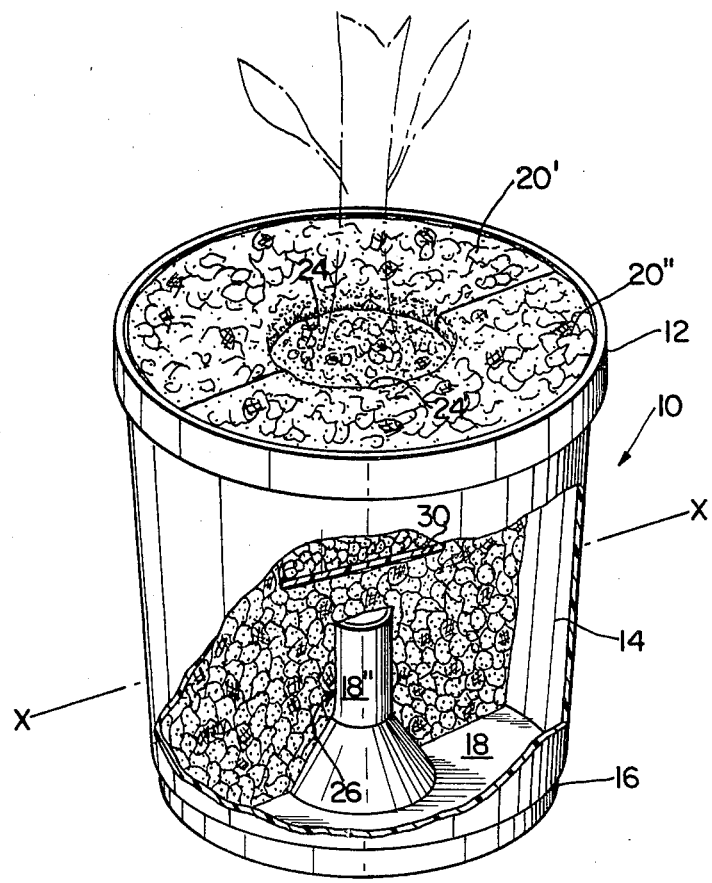
FIG. 1 is a view of the invention in perspective, a portion being broken away to reveal the interior of the pot.

The principal plant pot is designated in FIG. 1 as 10. It comprises an impermeable rigid conical upper part having an enlarged circumferential flange 12 at the top, the flange defining the opening. The flange removes a certain compressibility of the filler insert, thus facilitating its removal. At the bottom of the pot 10, a recessed shelf 16 is formed, the shelf being of lesser diameter than the intermediate wall 14. Significantly the pot 10 terminates in a closed bottom 18 the exterior of which defines plural support nibs 18', said nibs being adopted to raise the pot 10 above the floor of spillover tray, not shown, sufficiently to allow any excess water or liquid nutrient to flow out of the overfill tube 18". The overfill tube is formed integrally with the pot 10 and has open connection with the net pot cavity 30. Its bottom is of conical cross-section, leading at the apex to a tubular column extension. The functions of the overfill tube are to define the limit of water level in the pot, to preclude overfilling and allow spillover above a given maximum level "X" of the plant pot 10. Thus vapors from the saturated soiless media reservoir permeate both first and second or fillers with evaporate whereby the plant is constantly exposed to sustaining water or other fluid nutrient. Both soiless media fillers being treated with water soluble nutrients as may be necessary will effectively yield plant sustaining vapors so long as the reservoir may contain a fluid.

Figure 3:
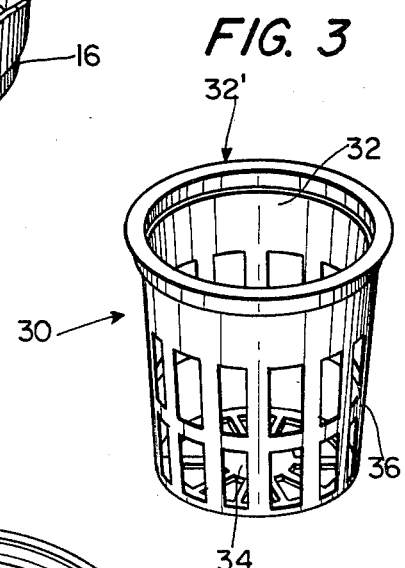
FIG. 3 is a view in perspective of net pot with growth media removed therefrom.
Figure 2:
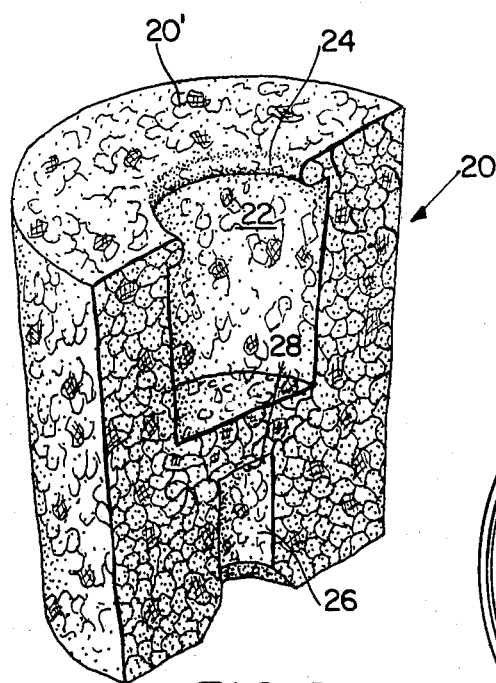
FIG. 2 is a view in perspective of one half the larger plant growth filler insert.
Figure 4:
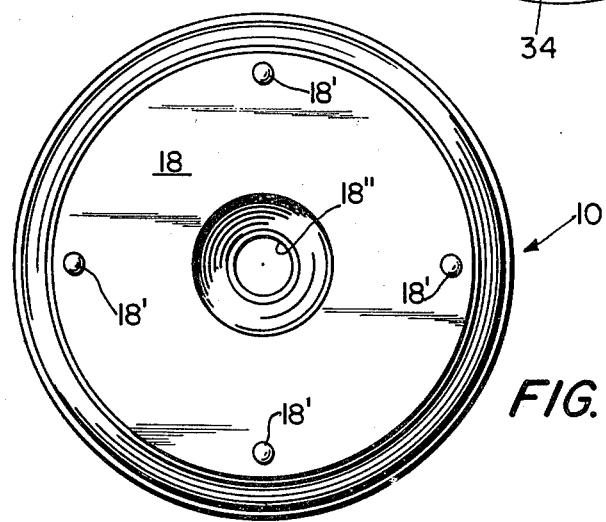
FIG. 4 is a bottom plan view of the invention.

Referring again to FIGS. 1 and 3 of the drawings, semi-rigid net growth pot 30 is shown containing a young seedling, growing in a natural soil or soiless media or filler, hereinafter defined as the second filler. This filler may comprise a fine inert composite of soft, permeable spongeous and fibrous materials, which it may be pretreated with water soluble nutrients such as will yield upon water or vapor contact. Net pot 30 is shown implanted as at a wholesale distributors, in a larger soiless filler 20 composed of two mirror image halves 20'+20". Cavity 22 in filler composite 20'+20" is so shaped as to resemble the exterior configuration of net growth pot 30, but it is of slightly diminished size. This cavity 22 is rimmed at its top by corresponding flexible flaps 24—24'. In effect a net pot sustaining shoulder is now formed by the flaps 24. Upon forcible insertion of the net pot, the flaps distend to later extend and secure the net pot when it is seated in the cavity. Corresponding halves 20'+21" being assembled as in FIG. 1 and having thus a slightly greater size exteriorly than the interior of the plant pot 10, provide a snug friction fit of the filler 20'+20" within the pot. The cavities 22 and 26 are preferably separated by a portion of the filler 20'+20" although they may be connected by opening into one another.

By design, the second soiless filler 20'—20" is made of composite fibrous and spongeous synthetic plastics which are cohesively bound together in a fluid-permeable state. It may be pretreated with water soluble nutrients. The vertical dimension is such that the filler 20—20' rests upon the bottom of the pot 10 for constant contact with the water and other fluid nutrient. Cavity 26 within filler 20—20' conforms to the overfill tube 18 of pot 10. Thus the reservoir of the pot 10 may be defined in maximum depth by the level "X" which is coextensive with the overall height of the overfill tube.

We claim:

1. A plant pot for the continuous growth, shipping and transfer of a living botanical, comprising in combination:
    (A) an outer pot of fluid impermeable material, said outer pot having an open end at its top and a closed end at its bottom, the bottom defining in upward extension thereof an open overfill tube;
    (B) corresponding first cohesive soiless media growth fillers, said fillers being in opposed contiguous relation to each other within the pot, each said filler defining a top cavity which is less than one half the vertical cross-section of a net pot to be inserted therein, said cavity being bounded on its top by an annular rim which is of smaller horizontal section than the top cavity, said fillers likewise defining a bottom vertical cavity to receive the overfill tube;
    (C) a net pot of plastic material for the botanical, said net pot having a second growth filler contained therein, said net pot with filler being forcibly seated within the top cavity of the first growth fillers and retained therein by the annular rim aforesaid, the first growth fillers and the net pot filler each containing a fluid-permeable soiless composite consisting of bonded, fibrous and spongeous matter, said first fillers together being of greater lateral dimension than the interior of the outer pot and the net pot filler being of greater volume than the top cavity defined by the first fillers, whereby the first and second fillers are compressibly held within the plant pot.

2. The plant pot of claim 1 wherein the corresponding first fillers consist of two mirror image segments each of which defines a half of a whole.

3. The plant pot of claim 1 wherein the outer pot defines plural spacing nibs on the bottom whereby to space the bottom of the plant pot sufficiently from a given support as to permit the flow of fluid overfill away from the bottom of the pot.

4. The plant pot of claim 3 wherein the corresponding first fillers consist of two mirror image segments each of which defines a half of a whole.

* * * * *